(12) United States Patent
Horiuchi et al.

(10) Patent No.: US 7,264,899 B2
(45) Date of Patent: Sep. 4, 2007

(54) FUEL CELL

(75) Inventors: Michio Horiuchi, Nagano (JP);
Shigeaki Suganuma, Nagano (JP);
Misa Watanabe, Nagano (JP); Shuji Yamazaki, Nagano (JP)

(73) Assignee: Shinko Electric Industries Co., Ltd., Nagano (JP)

( * ) Notice: Subject to any disclaimer, the term of this patent is extended or adjusted under 35 U.S.C. 154(b) by 744 days.

(21) Appl. No.: 10/642,342

(22) Filed: Aug. 18, 2003

(65) Prior Publication Data
US 2004/0126636 A1 Jul. 1, 2004

(30) Foreign Application Priority Data
Aug. 28, 2002 (JP) ............... 2002-248446

(51) Int. Cl.
*H01M 2/14* (2006.01)
*H01M 8/10* (2006.01)
(52) U.S. Cl. .......................... 429/30; 429/38
(58) Field of Classification Search .................. 429/30, 429/38
See application file for complete search history.

(56) References Cited

U.S. PATENT DOCUMENTS

| | | | |
|---|---|---|---|
| 4,863,813 A | | 9/1989 | Dyer |
| 4,876,163 A | * | 10/1989 | Reichner ...................... 429/30 |
| 4,988,582 A | | 1/1991 | Dyer |
| 5,094,928 A | | 3/1992 | Dyer |
| 5,219,673 A | | 6/1993 | Kaun |
| 6,063,517 A | | 5/2000 | Montemayor et al. |
| 7,049,024 B2 | * | 5/2006 | Leban .......................... 429/40 |
| 2002/0195335 A1 | * | 12/2002 | Cisar et al. .................. 204/283 |

FOREIGN PATENT DOCUMENTS

| | | |
|---|---|---|
| JP | A-5-62692 | 3/1993 |
| JP | A-7-282823 | 10/1995 |

OTHER PUBLICATIONS

Science vol. 288 (2000) p. 2031-2033, Jun. 16, 2000.

* cited by examiner

*Primary Examiner*—Tracy Dove
(74) *Attorney, Agent, or Firm*—Staas & Halsey LLP

(57) ABSTRACT

A fuel cell comprised of a solid electrolyte layer sandwiched by a cathode layer and an anode layer to which a mixed gas of a fuel gas and air mixed together is supplied, wherein the fuel cell is formed into a spiral member comprised of a single cell layer comprised of the cathode layer, solid electrolyte layer, and anode layer stacked together or a multilayer member of a plurality of the single cell layers stacked together rolled up spirally, the cathode layer and anode layer forming facing surfaces of each upper stratum and lower stratum of the single cell layer or multilayer member adjoining each other in a diametrical direction of the spiral member are arranged through an electrical insulator, and the cathode layer and anode layer or the electrical insulator are or is formed with a gas passage enabling passage of the mixed gas, whereby it is possible to prevent an increase in size of the cell even if increasing the contact area of the anode layer and cathode layer with the air or fuel gas.

3 Claims, 10 Drawing Sheets

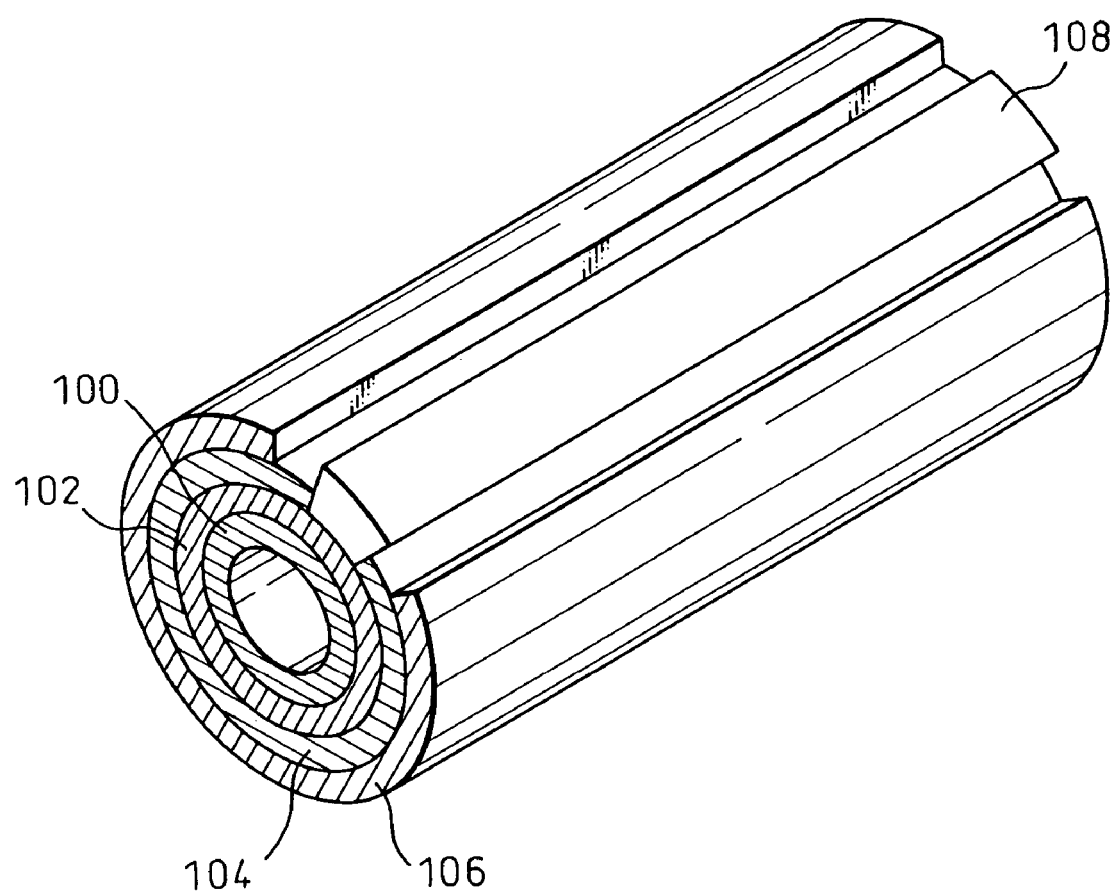

FUEL CELL

BACKGROUND OF THE INVENTION

1. Field of the Invention

The present invention relates to a fuel cell, more particularly relates to a fuel cell in which a cathode layer and anode layer sandwiching a solid electrolyte layer are supplied with a mixed gas of a fuel gas and air mixed together.

2. Description of the Related Art

A cylindrical fuel cell for use as a fuel cell is proposed in Japanese Unexamined Patent Publication (Kokai) No. 7-282823. This cylindrical fuel cell, as shown in FIG. 17, is comprised of a cylindrical base member 100 comprised of a porous ceramic, a porous anode layer (air electrode) 102 formed at the outer circumference of the cylindrical base member 100, a solid electrolyte 104 comprised of yttria-containing stabilized zirconia formed at the outer circumferential surface of the anode layer 102, and a cathode layer (fuel electrode) 106 formed at the outer circumferential surface of the solid electrolyte 104—all formed concentrically. Further, this cylindrical fuel cell has an interconnector 108 passing through the solid electrolyte 104 to be connected with the anode layer 102 and not in contact with the cathode layer 106. The surface of the cell is exposed. In this cylindrical fuel cell, by passing air through the inside the cylindrical base member in an atmosphere of 900 to 1000° C. and passing methane or hydrogen or another fuel gas along the outer circumferential surface of the cathode layer 106, it is possible to generate an electromotive force by the electrochemical reaction between the oxygen in the air and the fuel ingredients in the fuel gas.

Summarizing the problem to be solved by the present invention, according to the cylindrical fuel cell shown in FIG. 17, it is possible to reduce the size compared with a planar fuel cell and possible to easily separate the air flowing through the cylindrical base member 100 and the fuel gas flowing along the outer circumferential surface of the cathode layer 106. However, even with a cylindrical fuel cell, if trying to improve the power generation efficiency by increasing the contact area of the anode layer 102 and cathode layer 106 with the air or fuel gas, the cell has to be made larger in diameter and the fuel cell becomes larger in size.

SUMMARY OF THE INVENTION

An object of the present invention is to provide a fuel cell not increased in size even if increasing the contact area of the anode layer and cathode layer with the air or fuel gas.

The inventors engaged in studies to achieve this object and as a result found that when reliable separation of the air and fuel gas is necessary, the size of the fuel cell is proportional to the contact area of the anode layer and cathode layer with the air or fuel gas. In this regard, *Science*, vol. 288 (2000), p. 2031-2033, reports that if a fuel cell formed with a cathode layer and anode layer at the two surfaces of a solid electrolyte layer is placed in a mixed fuel gas of methane gas and oxygen, the fuel cell will generate an electromotive force. Therefore, the inventors concluded that it was not necessary to separate the flow of air at the anode layer side and the flow of fuel at the cathode layer side and that it was possible to freely change the shape of the fuel cell formed with the cathode layer and anode layer at the two surfaces of the solid electrolyte layer. As a result, they discovered a fuel cell enabling the contact area with the mixed gas to be increased to the maximum and thereby perfected the present invention.

That is, according to a first aspect of the present invention, there is provided a fuel cell comprised of a solid electrolyte layer sandwiched by a cathode layer and an anode layer to which a mixed gas of a fuel gas and air mixed together is supplied, wherein the fuel cell is formed into a spiral member comprised of a single cell layer comprised of the cathode layer, solid electrolyte layer, and anode layer stacked together or a multilayer member of a plurality of the single cell layers stacked together rolled up spirally, the cathode layer and anode layer forming facing surfaces of each upper stratum and lower stratum of the single cell layer or multilayer member adjoining each other in a diametrical direction of the spiral member are arranged through an electrical insulator, and the cathode layer and anode layer or the electrical insulator are or is formed with a gas passage enabling passage of the mixed gas.

According to a second aspect of the present invention, there is provided a fuel cell comprised of a solid electrolyte layer sandwiched by a cathode layer and an anode layer to which a mixed gas of a fuel gas and air mixed together is supplied, wherein the fuel cell is formed into a spiral member comprised of a single cell layer comprised of the cathode layer, solid electrolyte layer, and anode layer stacked together or a multilayer member of a plurality of the single cell layers stacked together rolled up spirally, facing surfaces of each upper stratum and lower stratum of the single cell layer or multilayer member adjoining each other in a diametrical direction of the spiral member are both formed by cathode layers or by anode layers, and the cathode layer and anode layer or facing surfaces of each upper stratum and lower stratum of the single cell layer or multilayer member have a gas passage enabling passage of the mixed gas formed between them.

According to a third aspect of the present invention, there is provided a fuel cell comprised of a solid electrolyte layer sandwiched by a cathode layer and an anode layer to which a mixed gas of a fuel gas and air mixed together is supplied, wherein the fuel cell is formed into a folded member comprised of a single cell layer comprised of the cathode layer, solid electrolyte layer, and anode layer stacked together or a multilayer member of a plurality of the single cell layers stacked together folded back and forth, facing surfaces of the adjoining strata of the single cell layer or multilayer member of the folded member are both formed by cathode layers or by anode layers, and the cathode layer and anode layer or facing surfaces of adjoining strata of the single cell layer or multilayer member have a gas passage enabling passage of the mixed gas formed between them.

That is, the fuel cell according to the present invention is comprised of a single cell layer of a cathode layer, solid electrolyte layer, and anode layer stacked together or of a multilayer member comprised of a plurality of such single cell layers rolled up spirally into a spiral member or folded back and forth into a folded member. Further, the cathode layer and anode layer of the single cell layer or multilayer member forming the spiral member or folded member or the facing surfaces of adjoining strata of the single cell layer or multilayer member have a gas passage enabling passage of a mixed gas of air and a fuel gas mixed together formed between them. This fuel cell does not require separation of the air and fuel since a mixed gas of air and the fuel gas is supplied. Therefore, the contact area of the anode layer and cathode layer of the single cell layer or multilayer member with the mixed gas can be easily enlarged. In addition, even if increasing the contact area of the anode layer and cathode layer of the single cell layer or multilayer member with the mixed gas, since the single cell layer or multilayer member is rolled up spirally into a spiral member or folded back and forth into a folded member, the size does not rapidly increase and an increase in cell size can be prevented.

BRIEF DESCRIPTION OF THE DRAWINGS

These and other objects and features of the present invention will become clearer from the following description of the preferred embodiments given with reference to the attached drawings, wherein:

FIG. 17 is a perspective view for explaining a conventional fuel cell.

DESCRIPTION OF THE PREFERRED EMBODIMENTS

Preferred embodiments of the present invention will be described in detail below while referring to the attached figures.

Figure 1A:
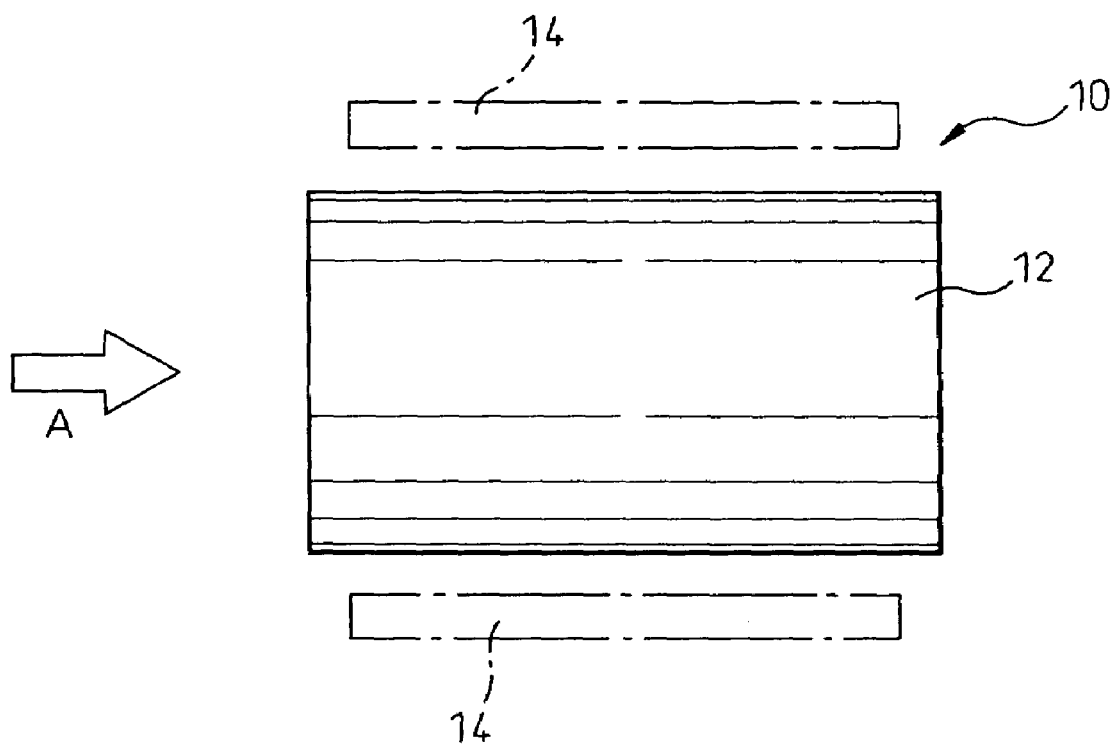
FIGS. 1A and 1B are a side view and a lateral sectional view for explaining an example of a fuel cell according to the present invention.
Figure 1B:
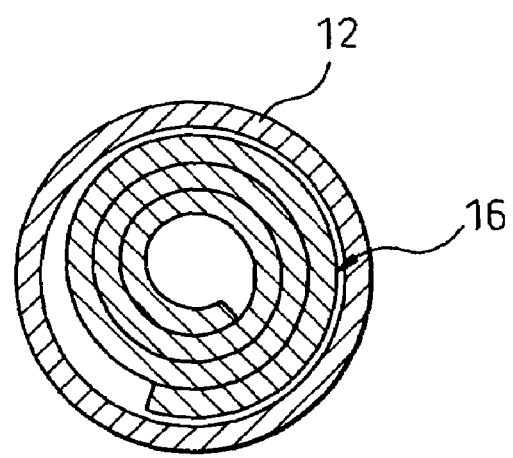

An example of a fuel cell according to the present invention is shown in FIGS. 1A and 1B. FIG. 1A is a side view of a fuel cell 10, while FIG. 1B is a lateral sectional view of a fuel cell 10. The fuel cell 10 shown in FIGS. 1A and 1B is comprised of a ceramic or other cylindrical hollow container 12 having heat resistance, to be heated by a heater 14, in which a spiral member 16 is housed. This spiral member 16, as shown in the partial sectional view of FIG. 2, is comprised of a single cell layer 18, comprised of a solid electrolyte layer 18a, a cathode layer 18b, and an anode layer 18c stacked together so that the solid electrolyte layer 18a is sandwiched between the cathode layer 18b and anode layer 18c, spirally rolled up sandwiching an electrical insulator 20.

This solid electrolyte layer 18a is an oxygen ion dielectric formed by zirconia oxide partially stabilized by yttrium (Y), scandium (Sc), or another element of Group III of the Periodic Table or cerium oxide doped with samarium (Sm), gadmium (Gd), etc. Further, the cathode layer 18b is formed from a manganese, gallium, or cobalt oxide compound of lanthanum to which strontium (Sr) or another element of Group III of the Periodic Table is added, while the anode layer 18c is formed by a nickel-cermet or platinum carrier to which a solid electrolyte forming the solid electrolyte layer 18a is added in an amount of 10 to 30 wt %. The cathode layer 18b and anode layer 18c formed in this way are porous layers having open porosities of at least 20%, preferably 30 to 70%, particularly preferably 40 to 50%. Further, since the cathode layer 18b and anode layer 18c forming the single cell layer 18 are porous layers, the electrical insulator 20 can be made a compact layer.

Figure 2:
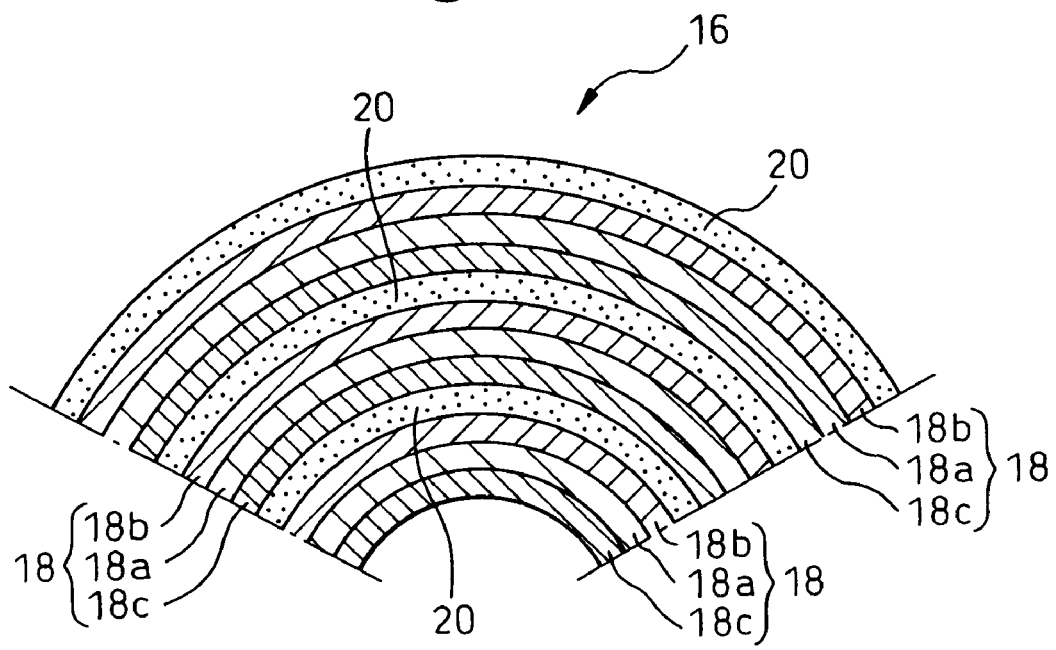
FIG. 2 is a partial sectional view of a spiral member of a fuel cell shown in FIGS. 1A and 1B.

The spiral member 16 forming the multilayer fuel cell 10 shown in FIGS. 1A and 1B and FIG. 2 can be produced by the following procedure. First, a green sheet for forming the solid electrolyte layer 18a is sandwiched between a green sheet for forming the cathode layer 18b and a green sheet for forming the anode layer 18c to form a single cell layer green sheet for forming the single cell layer 18. Next, the single cell layer green sheet is stacked with a green sheet comprised of alumina etc. for forming an electrical insulator 20. This multilayer green sheet is then rolled up from one end to the other end to form a rolled member. Next, the rolled member can be fired under conditions of an atmosphere where a compact solid electrolyte layer 18a and electrical insulator 20 are formed so as to obtain a spiral member 16 shown in FIG. 1B and FIG. 2.

The obtained spiral member 16, as shown in FIG. 1B, is housed in a hollow container 12. The spiral member 16 housed in this hollow container 12 is heated to a predetermined temperature by a heater arranged so as to surround the hollow container 12 while being supplied with a mixed gas of air and fuel gas mixed together from one end of the hollow container 12. The supplied mixed gas passes through the porous cathode layer 18b and anode layer 18c forming the single cell layer 18 and is exhausted from the other end of the hollow container 12. At this time, the oxygen ions obtained at the cathode layer 18b are conducted to the solid electrolyte layer 18a where they are electrochemically reacted with the fuel gas of the anode layer 18c, whereby electromotive force can be taken out from the cathode layer 18b and anode layer 18c. The electromotive force is preferably taken out from the cathode layer 18b and anode layer 18c of the part of the single cell layer 18 forming the topmost stratum of the spiral member 16. Further, the reaction gas obtained at the anode layer 18c by the reaction of the oxygen ions conducted through the solid electrolyte layer 18a and fuel gas is exhausted from the other end of the hollow container 12 together with the mixed gas.

Figure 3:
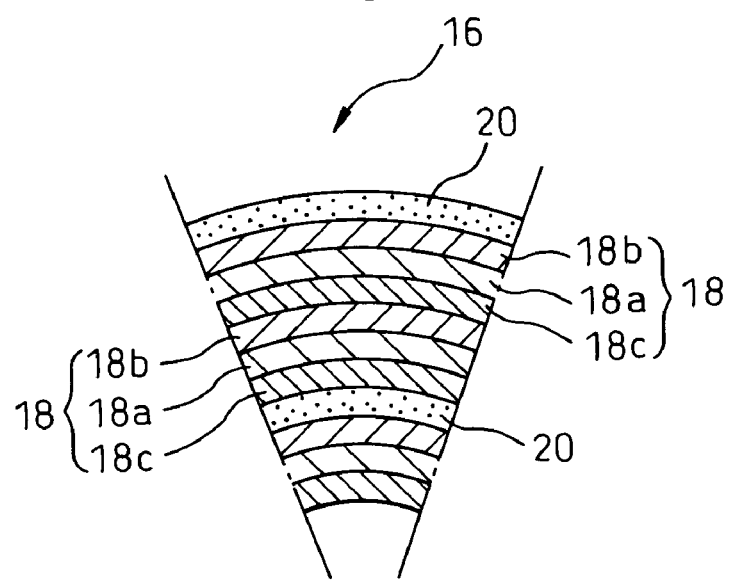
FIG. 3 is a partial sectional view for explaining another example of a spiral member forming a fuel cell shown in FIGS. 1A and 1B.

The spiral member 16 shown in FIG. 2 is comprised of strata of the electrical insulator 20 between which one stratum of the single cell layer 18 comprised of the solid electrolyte layer 18a, cathode layer 18b, and anode layer 18c stacked together is sandwiched. As opposed to this, as shown in FIG. 3, strata of the electrical insulator 20 may have a multilayer member comprised of two single cell layers 18, 18 stacked together sandwiched between them. In this case, an anode layer 18*c* forming one of the single cell layers 18, 18 forming the multilayer member and the cathode layer 18*b* forming the other single cell layer are made to contact each other in the stacking. In the spiral member 16 shown in FIG. 2, the electrical insulator 20 is formed as a compact layer, but it is also possible to form the electrical insulator 20 as a porous layer and form the solid electrolyte layer 18*a*, cathode layer 18*b*, and anode layer 18*c* into compact layers. In this case, it is preferable to make the open porosity of the porous layer of the electrical insulator 20 at least 20%, preferably 30 to 70%, in particular 40 to 50% in that this enables the mixed gas to be sufficiently supplied to the cathode layer 18*b* and anode layer 18*c* of the single cell layer 18. Further, in the spiral member 16 shown in FIG. 2 and FIG. 3, it is also possible to form all of the solid electrolyte layer 18*a*, cathode layer 18*b*, and anode layer 18*c* forming the single cell layer 18 and the electrical insulator 20 as porous layers having open porosities of at least 20%, preferably 30 to 70%, particularly preferably 40 to 50%.

Figure 4:
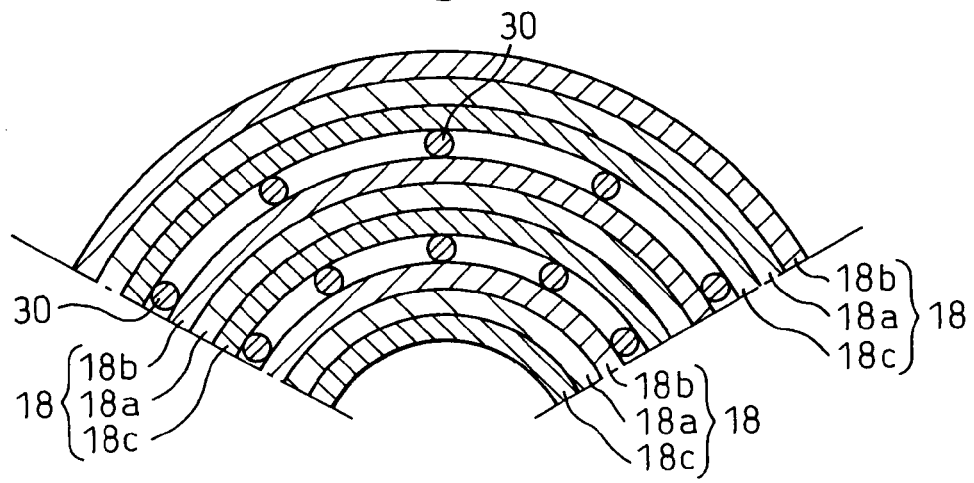
FIG. 4 is a partial sectional view for explaining another example of a spiral member forming a fuel cell shown in FIGS. 1A and 1B.

Here, in the spiral member 16 shown in FIG. 2 and FIG. 3, when the open porosities of the cathode layer 18*b* and the anode layer 18*c* become insufficient and the amount of passage of mixed gas is insufficient or when using a single cell layer 18 comprised of compact layers, instead of the electrical insulator 20, as shown in FIG. 4, it is also possible to provide a plurality of spacer members 30, 30 . . . between adjoining strata of the single cell layer 18 to form a mixed gas passage. The spacer members 30 shown in FIG. 4 are comprised of alumina ceramic or other electrical insulators. The layers forming the facing surfaces of strata of the single cell layer are the anode layer 18*c* and cathode layer 18*b*, so it is necessary to prevent electrical short-circuits between the two layers. The spacer members 30, 30 . . . may be shaped as rods extending in the longitudinal direction of the spiral member 16 or as points.

Figure 5:
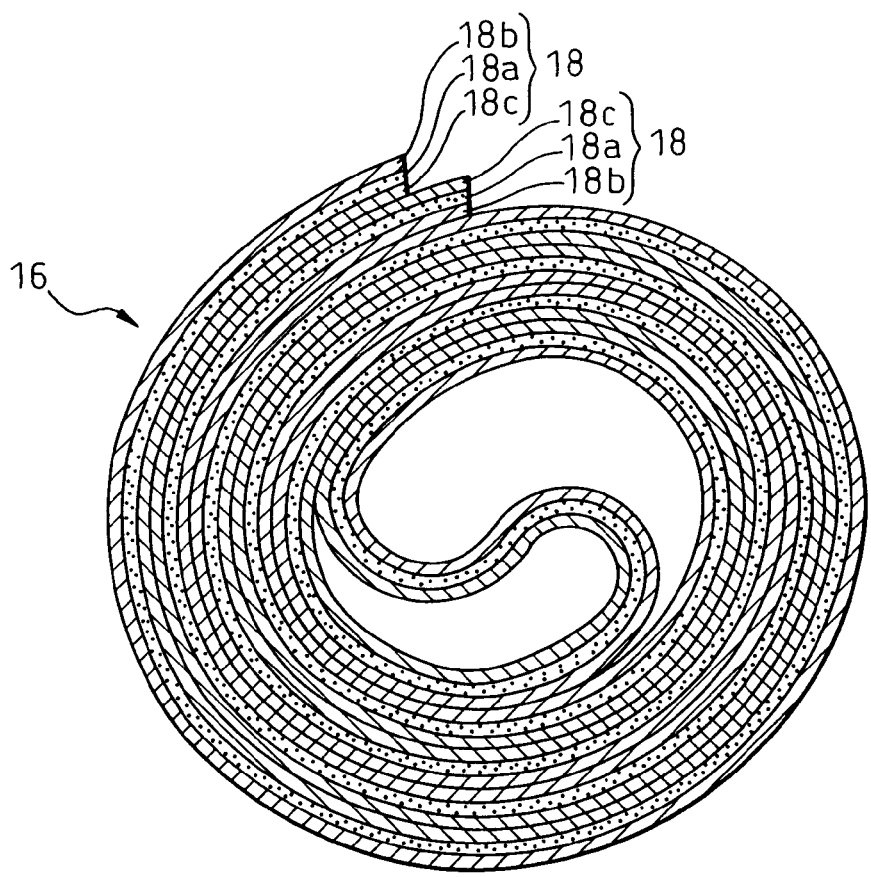
FIG. 5 is a lateral sectional view for explaining another example of a spiral member forming a fuel cell shown in FIGS. 1A and 1B.
Figure 6:
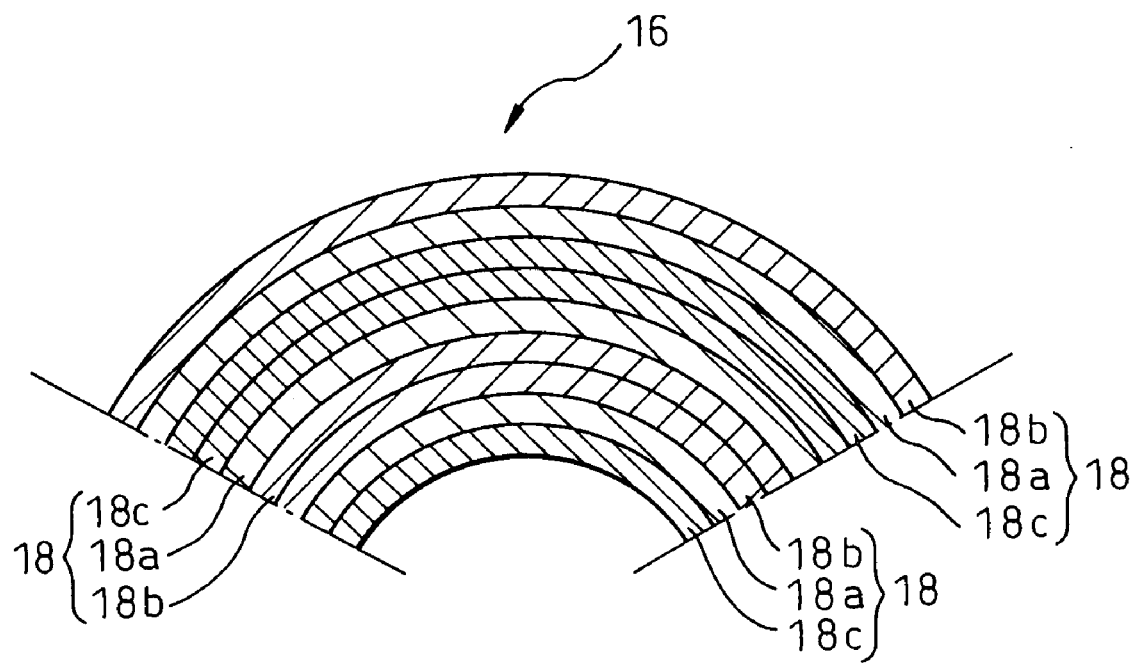
FIG. 6 is a partial sectional view for explaining the structure of the spiral member shown in FIG. 5.

The spiral member 16 shown in FIG. 2 and FIG. 3 requires the electrical insulator 20 or the spacer members 30 comprised of electrical insulators for preventing electrical short-circuits between strata of the single cell layer 18, but in the spiral member 16 shown in FIG. 5, as shown in the partial sectional view of FIG. 6, the electrical insulator 20 can be made unnecessary. This is because the spiral member 16 shown in FIG. 5 and FIG. 6 has an upper stratum of the single cell layer 18 and a lower stratum of the single cell layer 18 adjoining each other in the diametrical direction contacting each other by strata of the cathode layers 18*b* or by strata of the anode layers 18*c*. In the spiral member 16 shown in FIG. 5 and FIG. 6, it is possible to make the components the same as the solid electrolyte layer 18*a*, cathode 18*b*, and anode layer 18*c* forming the single cell layer 18 shown in FIG. 2 and FIG. 3, but at least the cathode layer 18*b* and the anode layer 18*c* are made porous layers enabling passage of the mixed gas. As each porous layer, one with an open porosity of at least 20%, preferably 30 to 70%, particularly 40 to 50%, is preferred. Further, the spiral member 16, as shown in FIG. 5, has the two ends of the single cell layer 18 positioned at the topmost surface of the spiral member 16, so it is possible to facilitate the connection with the lead wires for taking out the electromotive force.

Figure 7:
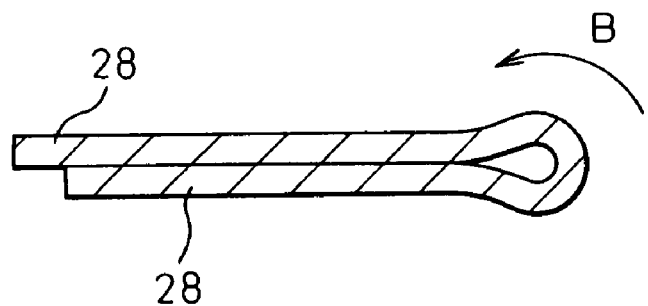
FIG. 7 is an explanatory view of the method of production of a spiral member of the structure shown in FIG. 5.

To form the spiral member 16 shown in FIG. 5 and FIG. 6, a green sheet for forming the solid electrolyte layer 18*a* is sandwiched between a green sheet for forming the cathode layer 18*b* and a green sheet for forming the anode layer 18*c* to form a single cell layer green sheet for forming the single cell layer 18. Next, as shown in FIG. 7, the single cell layer green sheet 28 is folded into two at its center so that surfaces of the green sheet for forming the cathode layer 18*b* or the green sheet for forming the anode layer 18*c* face each other. Next, this is rolled up from the folded end in the direction of the arrow B to obtain a spiral member comprised of green sheets. Next, the spiral member comprised of the green sheets can be fired at a predetermined temperature so as to form the spiral member 16 shown in FIG. 5 and FIG. 6. Further, it is also possible to form the solid electrolyte layer 18*a* of the single cell layer 18 as a porous layer and, as shown in FIG. 3, possible to fold a multilayer member comprised of a plurality of stacked single cell layers 18.

Figure 8A:
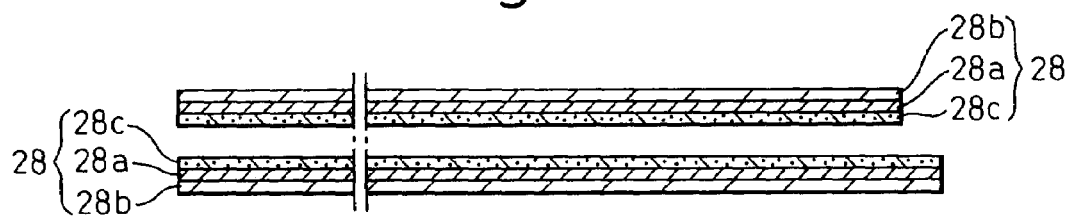
FIGS. 8A and 8B are explanatory views of another method of production of a spiral member of the structure shown in FIG. 6.
Figure 8B:
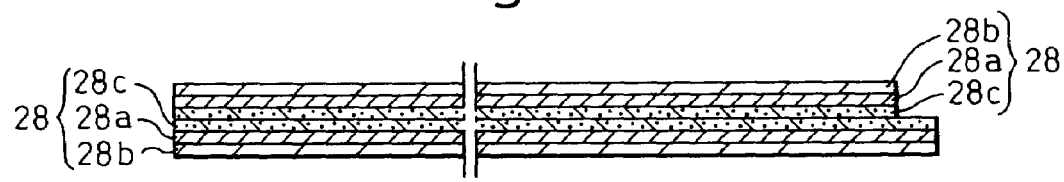

The spiral member 16 of the structure showed in FIG. 6 can be formed by the method of production shown in FIGS. 8A and 8B. In this method of production, first, as shown in FIG. 8A, two single cell layer green sheets 28, 28 are prepared. Next, the two single cell layer green sheets 28, 28, as shown in FIG. 8B, are stacked so that the green sheets 28*c* for forming anode layers 18*c* are contiguous to each other so as to thereby obtain a multilayer member. Next, this multilayer member is rolled up from one end in the direction of the other end to obtain a spiral member comprised of green sheets which can then be fired at a predetermined temperature so as to form the spiral member 16 of the structure shown in FIG. 6. Here, when stacking the two single cell green sheets 28, 28, as shown in FIG. 8A, different length single cell layer green sheets 28, 28 are stacked so that one end of the longer single cell layer green sheet 28 sticks out from the corresponding end of the shorter single cell layer green sheet 28. By rolling up the multilayer member stacked in this way from the other end where the ends of the single cell layer green sheets 28, 28 match, it is possible to obtain the spiral member 16 shown in FIG. 9. The spiral member 16 shown in FIG. 9 has the end of the end of the single cell layer 18 at the inner circumference side among the single cell layers 18, 18 forming the outermost strata sticking out from the end of the outer strata single cell layer 18. Therefore, it is possible to easily take out the lead wires 19*b*, 19*c* from the anode layer 18*c* of the inner strata single cell layer 18 and the cathode layer 18*b* of the outer strata single cell layer 18. In FIGS. 8A and 8B, the two single cell layer green sheets 28, 28 are stacked so that the green sheets 28*c* for forming the anode layers 18*c* are contiguous with each other so as to obtain a multilayer member, but it is also possible to stack them so that the green sheets 28*b* for forming the cathode layers 18*b* are contiguous with each other so as to obtain a multilayer member.

Figure 9:
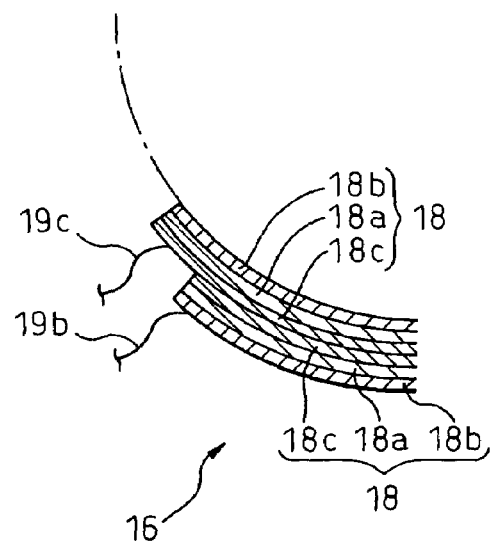
FIG. 9 is a partial sectional view of a spiral member obtained by the method of production shown in FIGS. 8A and 8B.
Figure 10:
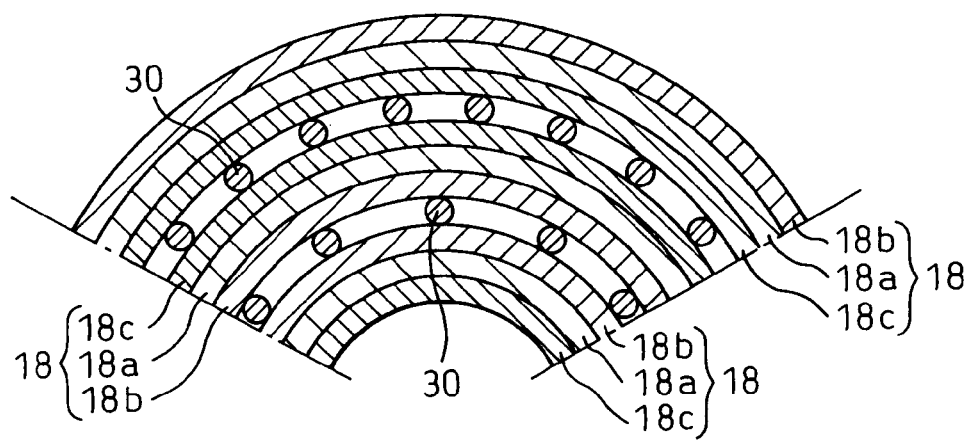
FIG. 10 is a partial sectional view for explaining another example of the spiral member shown in FIG. 5.

When the open porosities of the cathode layer 18*b* and the anode layer 18*c* of the spiral member 16 shown in FIG. 5 and FIG. 6 or FIG. 9 become insufficient and the amount of passage of mixed gas is insufficient or when using single cell layers 18 comprised of compact layers, as shown in FIG. 10, a plurality of spacer members 30, 30 . . . are arranged between the strata of the single cell layers 18 to form a mixed gas passage. The spacer members 30 shown in FIG. 10 may be electrical insulators or conductors since the strata forming the facing surfaces where the single cell layers 18, 18 face each other are both anode layers 18*c* or both cathode layers 18*b*. The members may be shaped as rods extending in the longitudinal direction of the spiral member 16 or as points.

Figure 11A:
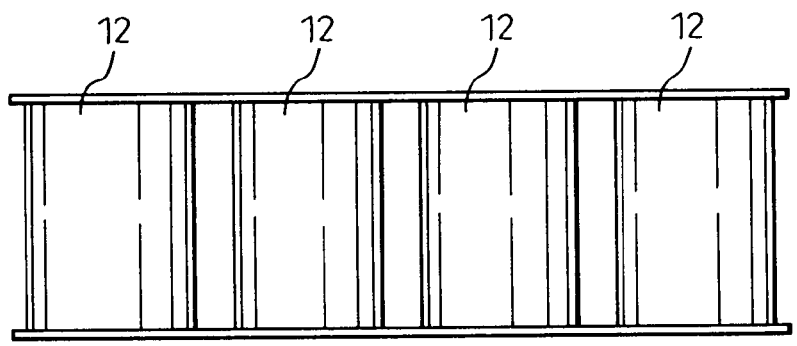
FIGS. 11A and 11B are schematic views for explaining a fuel battery comprised of fuel cells using spiral members shown in FIG. 5 or FIG. 9.
Figure 11B:
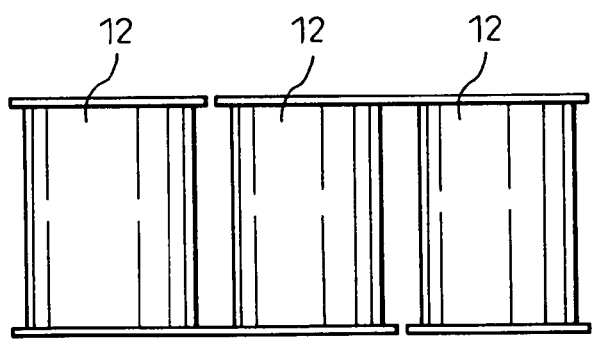

The spiral member 16 shown in FIG. 1B and FIG. 5 or FIG. 9, as shown in FIG. 1A or FIG. 9, has lead wires for taking out the electromotive force led out from the anode layer 18*c* and cathode layer 18*b*, is housed in a cylindrical hollow container 12 having heat resistance surrounded by a heater 14, and can generate power by being heated by the heater 14 to a predetermined temperature while supplying mixed gas from one side of the hollow container 12 in the arrow A direction. A fuel battery comprised of fuel cells using the spiral members 16, as shown in FIG. 1, may also include just a single fuel cell, but to obtain the desired voltage and current, as shown in FIGS. 11A and 11B, it usually includes a plurality of hollow containers 12, 12 . . . housing the spiral members 16 electrically connected in parallel or in series.

Figure 12:
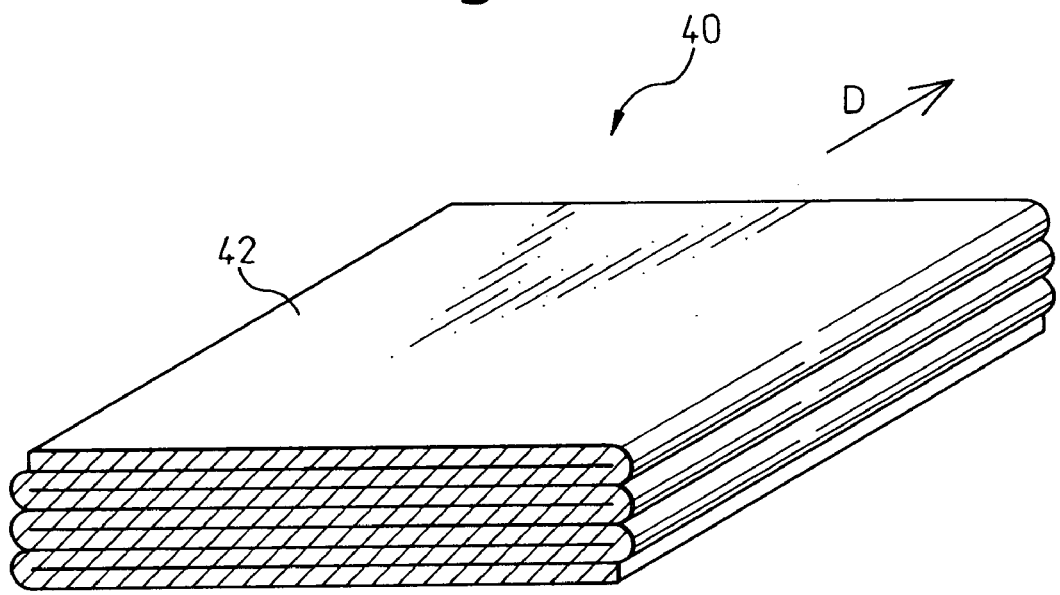
FIG. 12 is a perspective view for explaining another example of a fuel cell according to the present invention.
Figure 13:
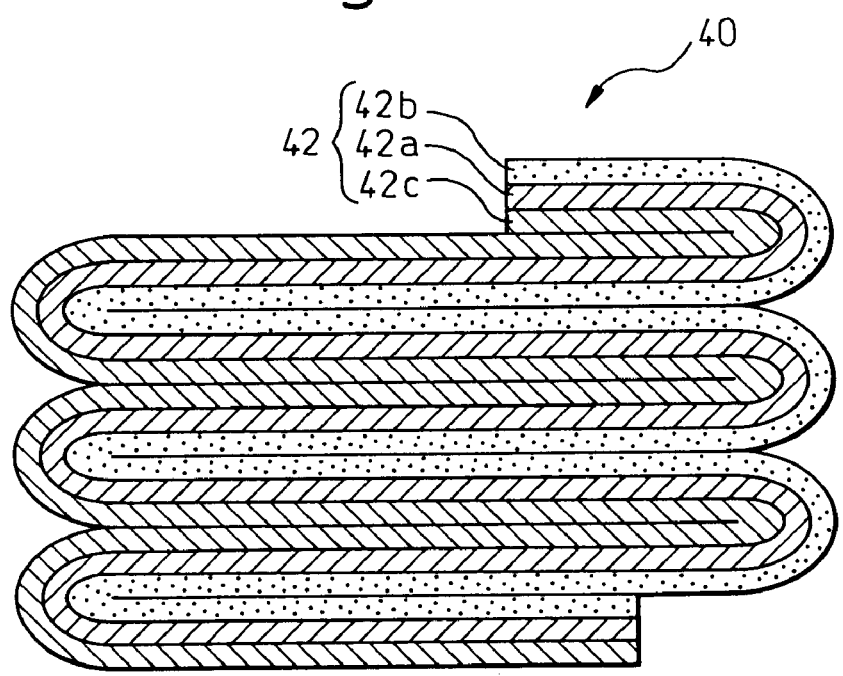
FIG. 13 is a sectional view of a folded member of a fuel cell shown in FIG. 12.
Figure 14:
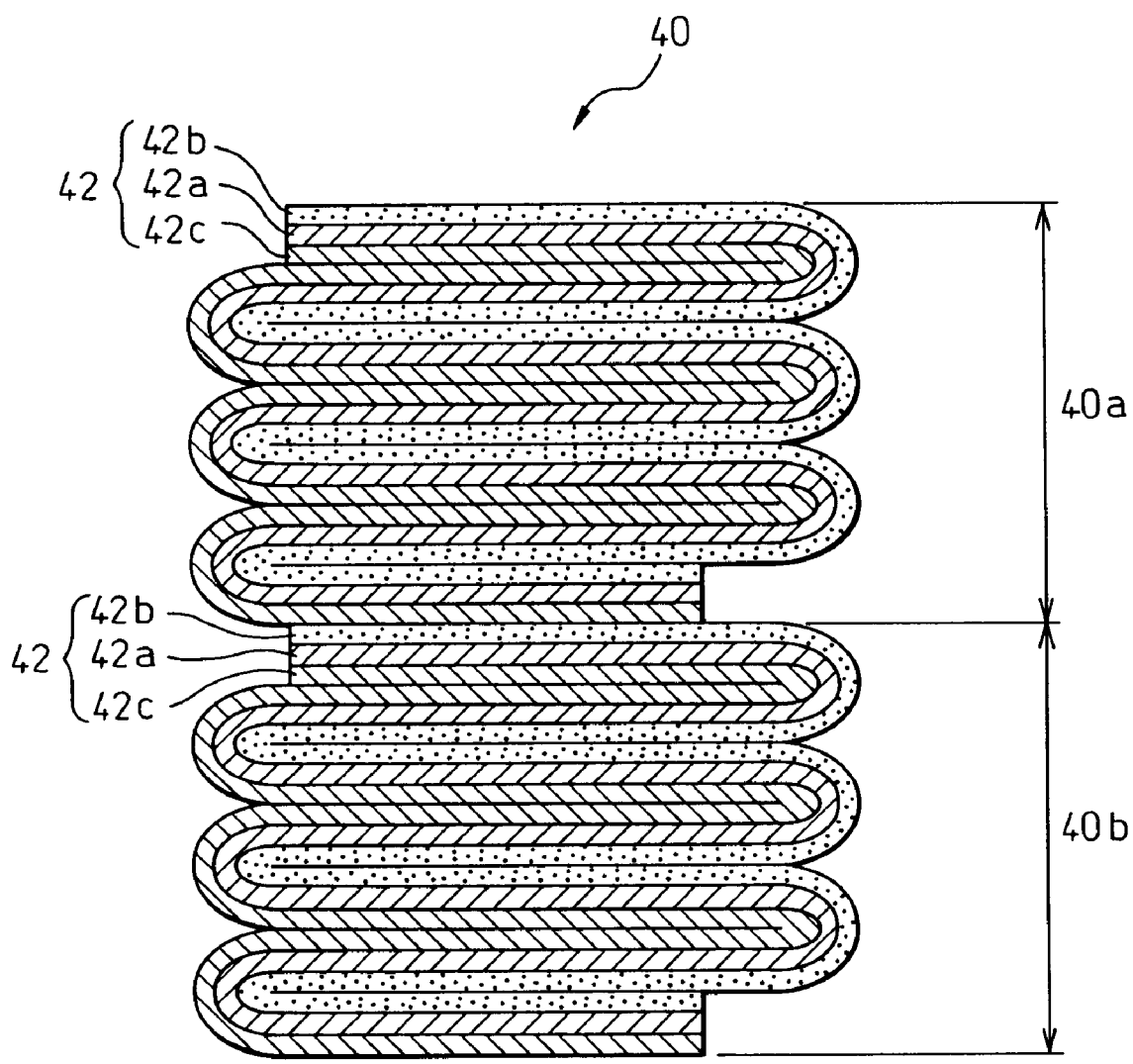
FIG. 14 is a sectional view of another example of a folded member of a fuel cell shown in FIG. 12.

In FIG. 1 to FIG. 11, a spiral member 16 housed in a cylindrical hollow container 12 was explained, but the fuel cell according to the present invention, as shown in FIG. 12, may also use a folded member 40 obtained by folding back and forth a single cell layer 42 comprised of a cathode layer 42b, solid electrolyte layer 42a, and anode layer 42c stacked together. In this folded member 40, as shown in FIG. 13, the strata of the single cell layer 42 adjoining each other in the vertical direction contact each other by strata of the cathode layer 42b or by strata of the anode layer 42c. Further, the cathode layer 42b and anode layer 42c are porous layers enabling passage of the mixed gas. As the porous layers, ones with open porosities of at least 20%, preferably 30 to 70%, particularly preferably 40 to 50% are used. The mixed gas supplied from one of the side ends of the folded member 40 where the cathode layer 42b and anode layer 42c are exposed passes through the cathode layer 42b and anode layer 42c of the folded member 40 and is exhausted from the other side end of the folded member as shown by the arrow D shown in FIG. 12 together with the gas produced due to the electrochemical reaction while the oxygen and fuel gas are consumed by the electrochemical reaction. The folded member 40, as shown in FIG. 3, may also be formed by folding back and forth a multilayer member comprised of a plurality of single cell layers 42. Further, a first folded member 40a and a second folded member 40b, as shown in FIG. 14, may be provided connected in series. This serial arrangement is achieved by the anode layer 42c forming the bottommost stratum of the folded member 40a and the cathode layer 42b forming the topmost stratum of the second folded member 40b contacting each other.

The folded member 40 shown in FIG. 13 or FIG. 14 is obtained as follows: A green sheet for forming the solid electrolyte layer 42a is sandwiched between a green sheet for forming the cathode layer 42b and a green sheet for forming the anode layer 42c so as to form a single cell layer green sheet for forming the single cell layer 42. Next, the single cell layer green sheet is folded back and forth to form a preform. Next, this preform can be fired under predetermined atmospheric conditions so as to obtain the folded member 40 shown in FIG. 13 or FIG. 14. Further, in the folded member 40 shown in FIG. 13 or FIG. 14, the solid electrolyte layer 42a may be a compact layer or a porous layer.

In the folded member 40 shown in FIG. 13 or FIG. 14, the strata of the single cell layer 42 adjoining each other in the vertical direction contact each other by the strata of the cathode layer 42b or by the strata of the anode layer 42c. Therefore, the cathode layer 42b and the anode layer 42c have to be porous layers. This embodiment cannot be applied to a single cell layer 42 where the cathode layer 42b and anode layer 42c are compact layers. As opposed to this, in the case of a folded member 40 shown in FIG. 15 or FIG. 16, the strata of the single cell layer 42 adjoining each other in the vertical direction have a passage for passing the mixed gas formed between them, so it is possible to form a folded member 40 even by a single cell layer 42 having a cathode layer 42b and anode layer 42c comprised of compact layers. Here, in the folded member 40 shown in FIG. 15, the passage for passing the mixed gas is formed by porous layers 44 provided between strata of the single cell layer 42 adjoining each other in the vertical direction. These porous layers 44 are preferably comprised of an alumina or other ceramic having an open porosity of at least 20%, preferably 30 to 70%, particularly preferably 40 to 50%.

Figure 15:
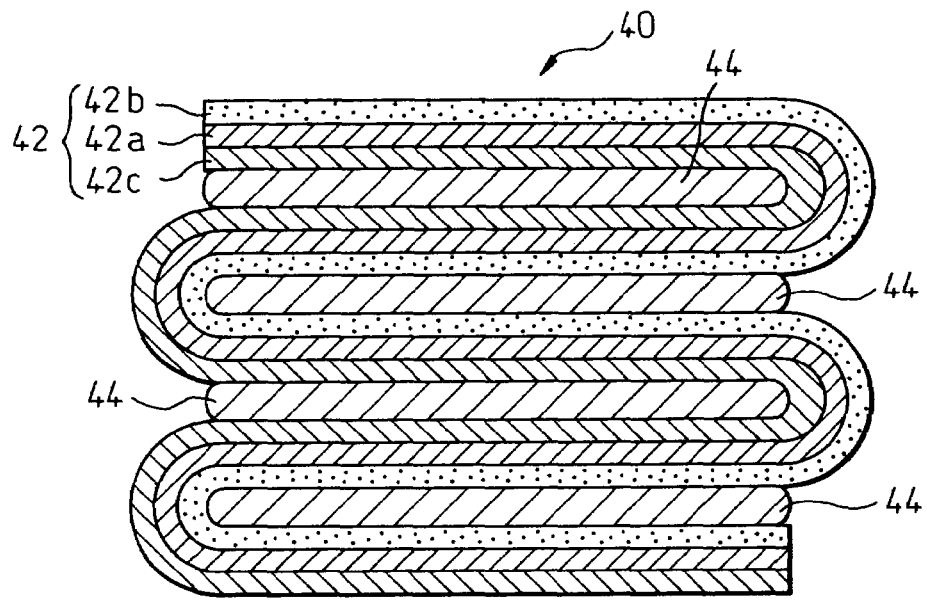
FIG. 15 is a sectional view of another example of a folded member of a fuel cell shown in FIG. 12.
Figure 16:
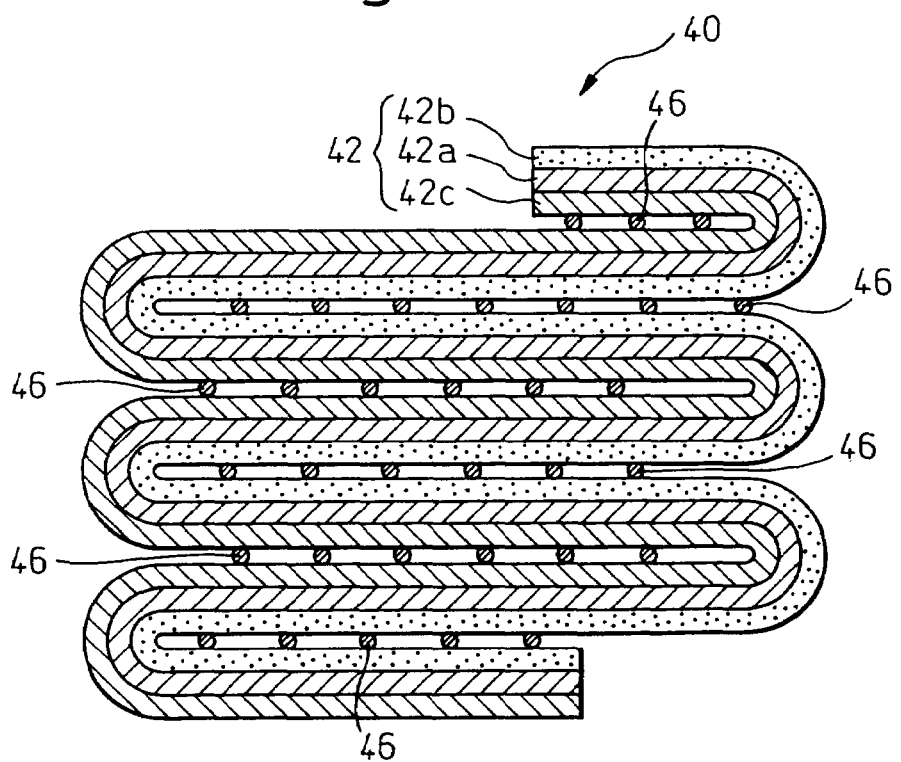
FIG. 16 is a sectional view of another example of a folded member of a fuel cell shown in FIG. 12.

To form the folded member 40 shown in FIG. 15, porous layer green sheets are fired to obtain porous layers 44 of a predetermined open porosity. Next, a single layer cell green sheet is sandwiched between the porous layers 44 fired in advance and the assembly is folded back and forth to form a preform. Next, this may be fired under firing conditions for densification of the single cell layer green sheet so as to obtain the folded member 40 shown in FIG. 15. Further, in the folded member 40 shown in FIG. 16, the adjoining strata of the single cell layer 42 are provided between them with a plurality of spacer members 46, 46 . . . to form a mixed gas passage. The spacer members 46 shown in FIG. 16 may be electrical insulators or conductors since the strata forming the facing surfaces of the single cell layer 42 are both strata of the anode layer 42c or cathode layer 42b. The members may be shaped as rods extending in the width direction of the folded member 40 or as points.

Each of the folded members 40 shown in FIG. 12 to FIG. 16 is provided with lead wires for taking out the electromotive force from the anode layer 42c and cathode layer 42c, is housed in a rectangular hollow container having heat resistance surrounded by a heater, and can generate power by being heated to a predetermined temperature by the heater and being supplied with mixed gas from one side of the hollow container in the arrow D direction (FIG. 12). In this case as well, as shown in FIGS. 11A and 11B, a plurality of hollow containers housing the folded members 40 may be arranged in parallel or in series.

Summarizing the effects of the invention, the fuel cell according to the present invention is comprised of a single cell layer of a cathode layer, solid electrolyte layer, and anode layer stacked together or a multilayer member of a plurality of single cell layers stacked together spirally rolled up into a spiral member or folded back and forth into a folded member. Therefore, it is possible to easily increase the contact area of the anode layer and cathode layer with the mixed gas without rapidly increasing the size of the spiral member or folded member. As a result, it is possible to reduce the size of a fuel battery using the fuel cells according to the present invention.

While the invention has been described with reference to specific embodiments chosen for purpose of illustration, it should be apparent that numerous modifications could be made thereto by those skilled in the art without departing from the basic concept and scope of the invention.

What is claimed is:

1. A fuel cell comprised of a solid electrolyte layer sandwiched by a cathode layer and an anode layer to which a mixed gas of a fuel gas and air mixed together is supplied, wherein:

the fuel cell is formed into a folded member comprised of a single cell layer comprised of the cathode layer, the solid electrolyte layer, and the anode layer, stacked together, or a multilayer member comprised of a plurality of the single cell layers, stacked together and folded back and forth, facing surfaces of the adjoining strata of the single cell layer or the multilayer member, of the folded member, are both formed by cathode layers or by anode layers, and the cathode layer and the anode layer, or facing surfaces of the adjoining strata of the single cell layer or the multilayer member, have spacer members forming a gas passage therebetween enabling passage therethrough of the mixed gas.

2. A fuel cell as set forth in claim 1, wherein each of the cathode layer and the anode layer is formed as a porous layer enabling passage therethrough of said mixed gas.

3. A fuel cell as set forth in claim 1, wherein facing surfaces of the adjoining strata of the single cell layer or of the multilayer member have provided between them a porous member enabling passage therethrough of said mixed gas.

* * * * *